United States Patent [19]

Inada et al.

[11] 4,328,832

[45] May 11, 1982

[54] MULTIPLE THROTTLE LEVEL ORIFICE APPARATUS

[75] Inventors: Masami Inada, Kariya; Kazuhiko Kitamura, Toyota; Shuji Okumura, Oubu; Takao Nonoyama; Riichi Tsuji, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 64,605

[22] Filed: Aug. 7, 1979

[30] Foreign Application Priority Data

Aug. 10, 1978 [JP] Japan .................................. 53-98086

[51] Int. Cl.$^3$ .......................... F16K 5/14; F16K 5/10
[52] U.S. Cl. .............................. 137/625.46; 251/180; 251/208; 251/297; 138/46
[58] Field of Search ................. 251/208, 297, 180; 137/625.46, 625.15; 138/46

[56] References Cited

U.S. PATENT DOCUMENTS

| | | | |
|---|---|---|---|
| 2,968,474 | 1/1961 | Eichelman et al. | 251/208 X |
| 3,014,489 | 12/1961 | Lamp, Jr. et al. | 137/625.15 X |
| 3,393,695 | 7/1968 | Wall | 251/180 X |
| 3,480,037 | 11/1969 | Alexander, Jr. | 251/208 X |
| 3,542,071 | 11/1970 | Lightner | 137/625.46 |
| 3,550,627 | 12/1970 | Alexander | 251/180 X |

*Primary Examiner*—Arnold Rosenthal
*Attorney, Agent, or Firm*—Sughrue, Mion, Zinn, Macpeak & Seas

[57] ABSTRACT

An orifice apparatus is provided which couples a vacuum advancer of a distributor associated with an engine for a vehicle with a carburetor of the engine. The orifice apparatus includes a body having an upper and a lower opening between which an isolation wall is formed in which a plurality of orifices are circumferentially spaced apart at an equal angular interval. A plurality of orifice members are disposed below the isolation wall and each has an orifice of a different diameter formed therein which is located below one of the plurality of orifices. A rotary plate is disposed above the isolation wall and is secured to a regulating member in the form of a rotatable shaft. A seal member is bonded to the lower surface of the rotary plate, which is formed with a passage port which can be brought into alignment with one of the plurality of orifices formed in the isolation wall. The rotary plate is urged by a single coiled spring toward the isolation wall so that the seal member is pressed to provide a hermetic seal between the rotary plate and the upper surface of the isolation wall. The seal member is formed with a plurality of openings, each corresponding to one of the plurality of orifices in the isolation wall and having a greater dimension than the corresponding orifice. These openings are circumferentially spaced apart at an equal angular interval. The regulating member is driven for rotation to move the passage port of the rotary plate from a position in which it is substantially aligned with one of the plurality of orifices formed in the isolation wall to another position in which it is aligned with another orifice, whereby the particular orifice which provides a communication between chambers formed in the body of orifice apparatus above and below the isolation wall is changed, thus changing the throttle level of the fluid path which joins the chambers.

5 Claims, 8 Drawing Figures

MULTIPLE THROTTLE LEVEL ORIFICE APPARATUS

BACKGROUND OF THE INVENTION

The invention relates to an orifice apparatus for use in a system which reduces noxious components of exhaust gas from an engine of an automobile, and more particularly, to such orifice apparatus capable of switching between a plurality of throttle levels for the gas flow.

An exhaust gas purifier system of an engine for an automobile, for example, an ignition timing control system of the spark delay type, employs a negative pressure delay valve including an orifice and a check valve to retard the transmission of a negative pressure to a vacuum angle advance diaphragm of a distributor. A speed reduction control system of the throttle positioner type, having the same function as an orifice and a check valve, is utilized to provide a more open position of a throttle valve during a speed reduction phase than an idle position in order to suppress the exhaust of unburned hydrocarbon.

However, the use of an orifice having a fixed throttle in these conventional exhaust gas purifier systems causes an accumulation of operational errors of various devices used in the system, resulting in a difficulty to achieve an optimum matching between exhaust gas, operating characteristic and fuel cost from vehicle to vehicle.

SUMMARY OF THE INVENTION

It is a first object of the invention to provide an orifice apparatus capable of throttle regulation. A second object is to provide an orifice apparatus in which a desired throttle level can be established in a facilitated manner. A third object of the invention is to provide an orifice apparatus which permits a stepwise adjustment of throttle levels. A further object of the invention is to provide an orifice apparatus having an adjustable throttle level for use in a fluid control system which is designed to reduce toxious components contained in an exhaust gas from an engine associated with a vehicle.

Above objects are accomplished in accordance with the invention by an orifice apparatus including a body which is divided into a first and a second chamber by an isolation wall in which a plurality of orifices are formed. A throttle control member which is formed with a communication port and rotatable about an axis is disposed within one of the chambers and is driven for rotation by a regulating member which is coupled therewith. In one preferred embodiment of the invention, the throttle control member comprises a rotary plate which is joined with a seal member having a relatively large opening and which is formed with a communication port within the extent of the opening. The plurality of orifices formed in the isolation wall are distributed within an extent of rotation of the relatively large opening of the seal member, and have different throttle levels. In another embodiment of the invention, the plurality of orifices formed in the isolation wall are distributed within an extent of rotation of the relatively large opening in the seal member in such a density along the direction of rotation that one or two or more of the orifices are simultaneously located in opposing relationship with the relatively large opening.

DESCRIPTION OF EMBODIMENTS

Figure 1:
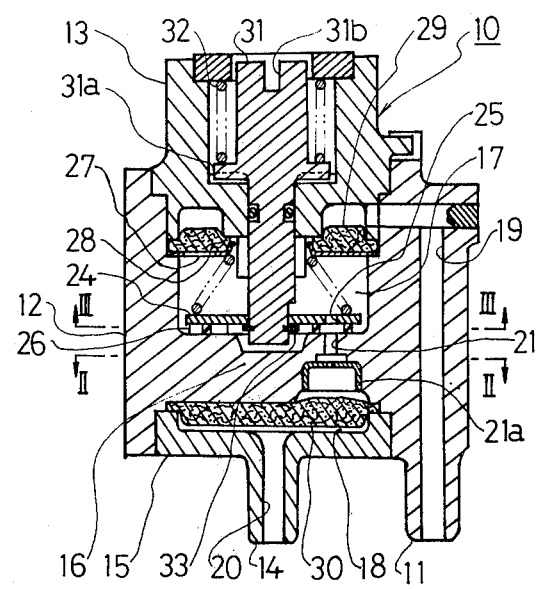
FIG. 1 is a longitudinal section of an embodiment of the invention.

Referring to FIG. 1, there is shown an orifice apparatus having a plurality of selectable throttle levels. The apparatus 10 includes a body 12 having an input port 11, and a first cover 13 and a second cover 15 having an output port 14 formed therein are integrally secured to an upper and a lower opening end of the body 12. An isolation wall 16 is integrally formed with the body 12, and divides the latter into a first chamber 17 and a second chamber 18 in a hermetic manner. The first chamber 17 communicates with the input port 11 through a path 19 which is formed in the body 12 while the second chamber 18 communicates with the output port 14 through another path 20 which is formed in the second cover 15.

Figure 2:
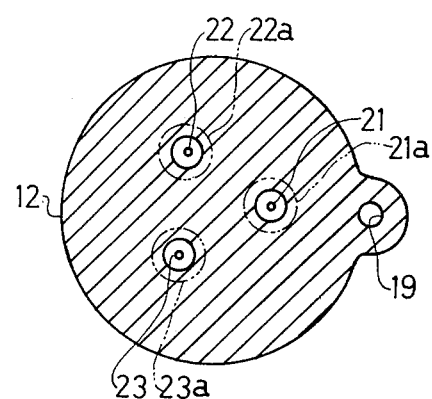
FIG. 2 is a cross section taken along the line II—II shown in FIG. 1.
Figure 3:
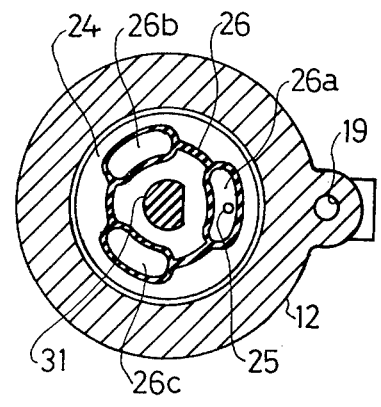
FIG. 3 is a cross section taken along the line III—III shown in FIG. 1.

A first, a second and a third orifice passage 21, 22, 23 are formed in the isolation wall 16 and are circumferentially spaced apart at an equal angular interval (see FIG. 2). Each of these orifice passages have a lower opening of an increased diameter, and orifice members 21a, 22a, 23a having different throttle levels are inserted into these lower openings. A rotary disc 24 is rotatably disposed above the upper surface of the isolation wall 16, and is formed with a single communication port 25 (see FIG. 3). A member 26 (see FIG. 3) which comprises an elastic material such as rubber is secured to the surface of the rotary disc 24 which faces the isolation wall 16. The purpose of the seal member 26 is to seal the opening of the orifice passages 21, 22, 23 in the isolation wall 16, and it is formed with oblong or elliptical openings 26a, 26b, 26c in alignment with the openings of the orifice passages. In the position shown, the first orifice passage 21 communicates with the communication port 25 in the rotary disc 24 while the second and the third orifice passage 22, 23 are blocked by the rotary disc 24 and the seal member 26 secured thereto. Thus, a communication between the first chamber 17 and the second chamber 18 is provided by the first orifice passage 21 and the orifice member 21a. Received within the first chamber 17 is a spring 28 having one end anchored to a retainer 27 and its other end which maintains the rotary disc 24 to be urged downwardly (as viewed in FIG. 1), whereby a seal is maintained between the rotary disc 24 and the upper surface of the isolation wall 16. It is to be noted that a pair of filters 29, 30 are disposed within the first and the second chamber 17, 18 for removing any impurity contained in the fluid.

A regulating member 31 is disposed to extend through an axial bore of the first cover 13, and has its lower end connected with the rotary disc 24. Intermediate its length, it is formed with a flange 31a which is urged downward by a spring 32. In addition, in its upper end, the regulating member 31 is formed with a groove 31b adapted to be engaged by a suitable tool to turn it. The flange 31a, on its under surface, has tapered radial projections 31c which are circumferentially spaced apart at an equal angular interval. Corresponding to the projections, the first cover 13 is formed with tapered radial recesses 13a in its inner bottom surface. The recesses are circumferentially spaced apart at an equal angular interval and receive the tapered radial projections. In the position shown in FIG. 1 the projections are fallen in the recesses, thus the seal member 26 engages the upper surface of the isolation wall 16. A ring member 33 is secured to the lower end of the regulating member 31 and locks the rotary disc 24 against withdrawal from the regulating member 31. By engaging a suitable tool with the groove 31b to turn the regulating member 31, the rotary disc 24 can be brought to a desired position. During the rotation of the regulating member 31, at first the tapered radial projections of the flange 31a slip out of the tapered radial recesses of the first cover 13. Then the regulating member 31 rises and the seal member 26 leaves the upper surface of the isolation wall 16. After the rotation of an angular interval, the tapered radial projections again fall in the tapered radial recesses. In this manner, it is possible to select any particular one of the first to third orifice passages 21 to 23 to provide a communication between the first chamber 17 and the second chamber 18 or between the input port 11 and the output port 14.

Figure 4:
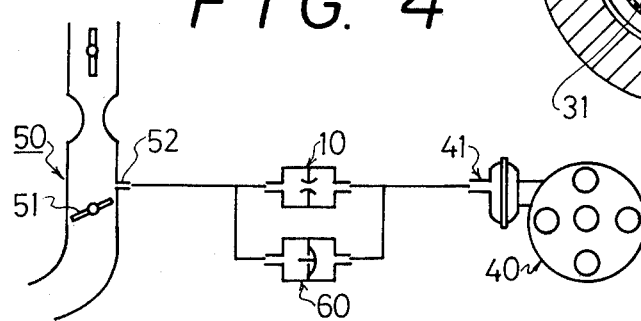
FIG. 4 is a schematic view of an ignition timing control system of an engine associated with an automobile in which the orifice apparatus of FIG. 1 is incorporated.

FIG. 4 is a schematic diagram illustrating the orifice apparatus 10 shown in FIG. 1 as applied to an ignition timing control system of a spark delay type. As is well recognized, in this system, the ignition timing is retarded in an acceleration range in which the amount of $NO_x$ produced is at its maximum in order to reduce the amount of $NO_x$, HC produced. Specifically, the system includes a distributor 40 having a vacuum advancer 41 associated therewith. The orifice apparatus 10 of the invention is connected in shunt with a check valve unit 60 between the vacuum advancer 41 and an advance port 52 which is located slightly above an idle position of a throttle valve 51 of a carburetor 50. The action of the orifice apparatus 10 which delays the transmission of a negative pressure prevents an increase in the negative pressure which prevails in the advance port 52 from being immediately transmitted to the vacuum advancer 41, thus retarding the angle advance action. This is particularly effective, during an acceleration phase when an accelerator pedal is depressed from its free conditions as when starting or when changing the gear.

In the spark delay arrangement described above, any operational error in the distributor 40, the carburetor 50 or the check valve unit 60 can be compensated for by suitably switching an effective orifice passage of the orifice apparatus 10, thus permitting an optimum control from vehicle to vehicle.

Figure 5:
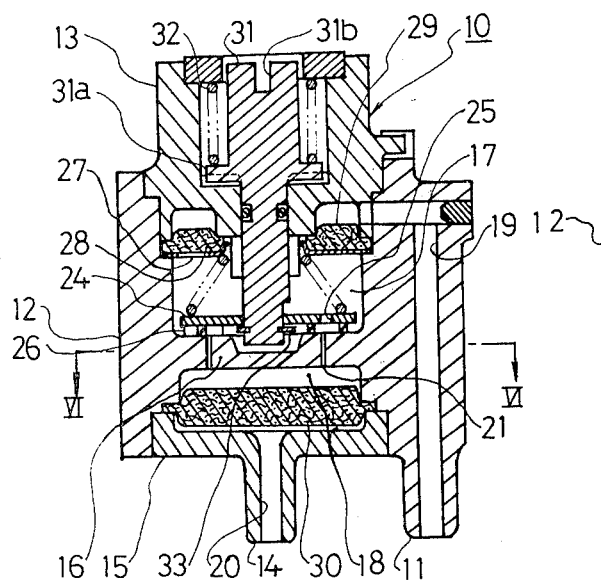
FIG. 5 is a longitudinal section of another embodiment of the invention.
Figure 6:
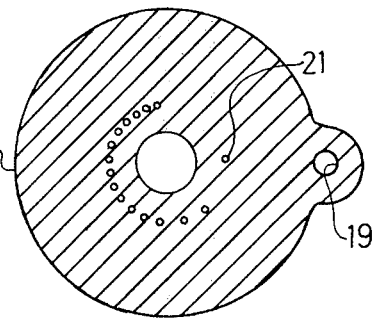
FIG. 6 is a cross section taken along the line VI—VI shown in FIG. 5.
Figure 8:
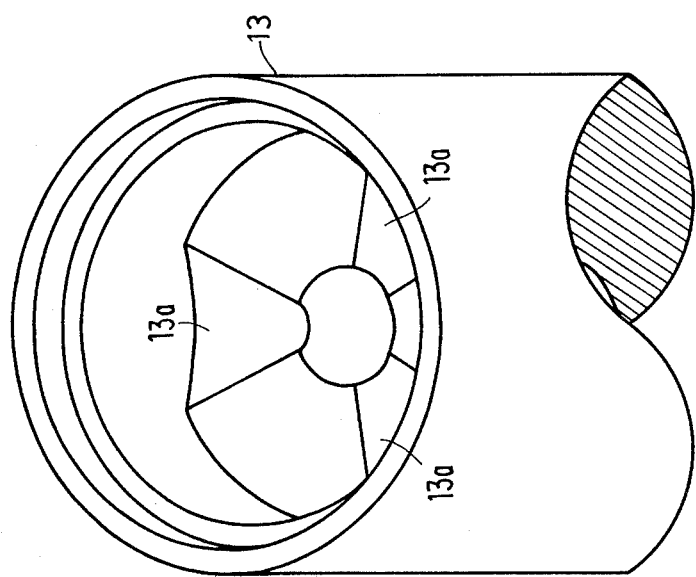
FIGS. 7 and 8 are perspective views illustrating the manner in which radial projections 31c on the flange 31a cooperate with the radial recesses 13a in the cover 13.
Figure 7:
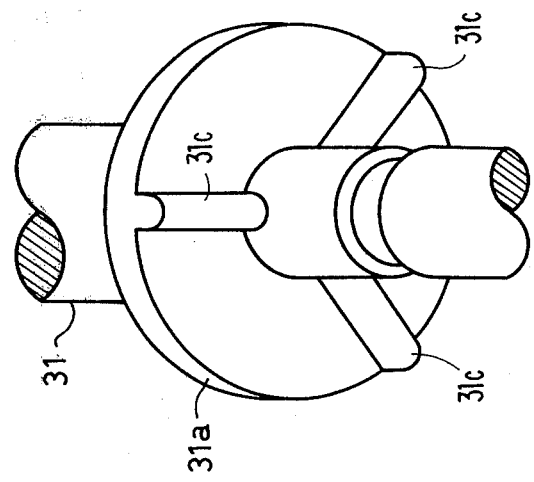

In the orifice apparatus 10 described above, the first, the second and the third orifice passages 21, 22, 23 have different throttle levels, any one of which can be selected by means of the regulating member 31 to provide a communication between the chambers 17, 18. However, it is also possible to establish an equal throttle level for a plurality of orifice passages, and the throttle level between the input port 11 and the output port 14 can be changed over a plurality of levels by controlling the number of orifice passages which provide a communication between the both chambers 17, 18. Such an embodiment is shown in FIGS. 5 and 6. In this instance, a plurality of orifices 21 are formed in the isolation wall 16 in a manner such that zero, one, two three - - - orifices are disposed in opposing relationship with the opening 26a formed in the seal member 26 as the regulating member 31 is turned. Construction of the rotary disc 24 and the seal member 26 is identical with those shown in FIG. 1.

As discussed above, in the orifice apparatus of the invention, the isolation wall 16 divides the interior of the body into the first chamber 17 and the second chamber 18, and the isolation wall 16 is formed with a plurality of orifice passages 21, 22, 23. The provision of the rotary disc 24 which selectively opens or closes the orifice passages and the regulating member 31 which controls the angular position of the rotary disc 24 permits the fluid flow or the throttle level between the input port 11 and the output port 14 to be changed over a plurality of levels. Consequently, when the apparatus is applied to a variety of exhaust gas purifier systems, an optimum matching between exhaust gas, operating characteristic and fuel cost can be achieved from vehicle to vehicle, affording a great practical advantage.

What is claimed is:

1. A multiple throttle level orifice apparatus comprising a body, an isolation wall which divides the interior of the body into first and second chambers, a plurality of orifice passages formed in the isolation wall in parallel relationship with each other so as to provide communication between said chambers, a throttle control member for selectively opening and closing said orifice passages, and a regulating member for selectively operating the control member to select an orifice passage to provide said communication between the chambers; said throttle control member comprising a rotatable plate secured to said regulating member and having a communication port formed therein, and a seal member bonded to the rotatable plate's surface facing said isolation wall and having therein a plurality of large openings of larger diameter than said orifice passages; said communication port being located within the extent of one of said openings in said seal member; said apparatus further comprising spring means normally urging said seal member into engagement with said isolation wall so that said openings surround and seal said orifice passages; said regulating member comprising means for disengaging said seal member from said isolation wall and for unsealing said openings from said orifice passages; said body comprising a cover having tapered radial recesses therein, and said disengaging means having tapered radial projections which are received in said recesses whereby, when said rotatable plate is rotated, said seal member is lifted and disengaged from said isolation wall.

2. An orifice apparatus according to claim 1 in which the plurality of orifice passages are distributed in a density such that no more than one orifice passage is located opposite to the opening in the seal member at any angular position of the rotary plate.

3. An orifice apparatus according to claim 1 in which said plurality of orifice passages is distributed in a density within the extent of the angular movement of said one opening in the seal member such that two or more of said orifice passages are located opposite said one opening in the seal member at at least one angular position of the rotary plate.

4. An orifice apparatus according to claims 1 or 3 wherein said plurality of orifice passages all have the same throttle level.

5. An orifice apparatus according to claims 1 or 2 wherein said plurality of orifice passages have different throttle levels.

* * * * *